(12) United States Patent
Lee et al.

(10) Patent No.: US 12,195,643 B2
(45) Date of Patent: Jan. 14, 2025

(54) ADHESIVE FILM FOR POLARIZING PLATE, POLARIZING PLATE COMPRISING THE SAME AND OPTICAL DISPLAY APPARATUS COMPRISING THE SAME

(71) Applicant: Samsung SDI Co., Ltd., Yongin-si (KR)

(72) Inventors: Seung Jun Lee, Suwon-si (KR); Dae Yun Kim, Suwon-si (KR); Il Jin Kim, Suwon-si (KR); Mi Yeon Yu, Suwon-si (KR); Woo Jin Jeong, Suwon-si (KR); Ha Yun Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 628 days.

(21) Appl. No.: 17/376,881

(22) Filed: Jul. 15, 2021

(65) Prior Publication Data

US 2022/0049136 A1    Feb. 17, 2022

(30) Foreign Application Priority Data

Aug. 11, 2020  (KR) .................. 10-2020-0100665

(51) Int. Cl.
*C09J 133/08* (2006.01)
*C08K 5/315* (2006.01)
(Continued)

(52) U.S. Cl.
CPC ............. *C09J 133/08* (2013.01); *C08K 5/315* (2013.01); *C09J 133/10* (2013.01);
(Continued)

(58) Field of Classification Search
CPC ...... C09J 133/10; C09J 133/04; C09J 133/08; C09J 2433/00; C09J 2203/318;
(Continued)

(56) References Cited

U.S. PATENT DOCUMENTS

2015/0205025 A1* 7/2015 Park .................. G02B 1/10
                                                    359/483.01
2016/0238771 A1* 8/2016 Lee ................... G02B 5/3033
(Continued)

FOREIGN PATENT DOCUMENTS

CN    104861905 A    8/2015
CN    106811156 A    6/2017
(Continued)

OTHER PUBLICATIONS

Korean Office Action dated Oct. 19, 2022 issued in corresponding KR Application No. 10-2020-0100665 (6 pages).
(Continued)

*Primary Examiner* — Sophie Hon
(74) *Attorney, Agent, or Firm* — Lewis Roca Rothgerber Christie LLP (57) ABSTRACT

An adhesive film for polarizing plates, a polarizing plate including the same, and an optical display apparatus including the same are provided. An adhesive film for polarizing plates is formed of an adhesive composition including a (meth)acrylic copolymer, an isocyanate curing agent, a metal chelate curing agent, and an antistatic agent, and has a surface resistance difference $\Delta SR$ of 1.0 ($\log(\Omega/\square)$) or less, as calculated by Equation 1 and, in Equation 1, SR1 is 10 ($\log(\Omega/\square)$) or less.

16 Claims, 1 Drawing Sheet

(51) Int. Cl.
*C09J 133/10* (2006.01)
*G02B 5/30* (2006.01)
*G02F 1/1335* (2006.01)
*C08F 220/18* (2006.01)
*C08F 220/20* (2006.01)
*C08F 220/30* (2006.01)

(52) U.S. Cl.
CPC ..... *G02B 5/3041* (2013.01); *G02F 1/133528* (2013.01); *C08F 220/1804* (2020.02); *C08F 220/20* (2013.01); *C08F 220/301* (2020.02); *C09J 2203/318* (2013.01); *C09J 2301/414* (2020.08); *C09J 2433/00* (2013.01); *G02F 2202/28* (2013.01)

(58) Field of Classification Search
CPC ............ C09J 2203/326; C09J 2301/414; C09J 175/04; C09J 7/30; C09J 7/305; C09J 7/385; C09J 7/10; C09J 11/06; C09J 2301/312; C08F 220/1804; C08F 220/20; C08F 220/301; C08F 220/14; C08F 220/1811; C08K 5/315; C08K 5/29; C08K 2201/017; C08K 5/5435; C08K 5/43; G02B 5/305; G02B 5/3041; G02B 5/3025; G02B 5/3016; G02B 5/2022; G02F 1/133528; G02F 2202/28; C08G 18/003; C08G 18/222; C08G 18/5229; C08G 18/794

See application file for complete search history.

(56) References Cited

U.S. PATENT DOCUMENTS

| | | | |
|---|---|---|---|
| 2017/0152414 A1* | 6/2017 | Lee | C09J 11/06 |
| 2019/0106608 A1* | 4/2019 | Jozuka | C09J 133/00 |
| 2020/0033674 A1* | 1/2020 | Fujita | C09J 139/08 |

FOREIGN PATENT DOCUMENTS

| | | | | |
|---|---|---|---|---|
| CN | 114075414 B | * | 8/2023 | ............ C08K 5/315 |
| JP | 2010021048 A | * | 1/2010 | ............ G06F 3/045 |
| JP | 2012-131963 A | | 7/2012 | |
| JP | 2013-072951 A | | 4/2013 | |
| KR | 10-2009-0045122 A | | 5/2009 | |
| KR | 10-2012-0109398 A | | 10/2012 | |
| KR | 10-2016-0135199 A | | 11/2016 | |
| KR | 10-2017-0072371 A | | 6/2017 | |
| KR | 102606518 B1 | * | 11/2023 | ............ C09J 7/385 |

OTHER PUBLICATIONS

Chinese Office Action dated Dec. 13, 2022 issued in corresponding CN Application No. 202110873602.8 (6 pages).

* cited by examiner

ADHESIVE FILM FOR POLARIZING PLATE, POLARIZING PLATE COMPRISING THE SAME AND OPTICAL DISPLAY APPARATUS COMPRISING THE SAME

CROSS-REFERENCE TO RELATED APPLICATION

This application claims priority to and the benefit of Korean Patent Application No. 10-2020-0100665, filed on Aug. 11, 2020 in the Korean Intellectual Property Office, the entire disclosure of which is incorporated herein by reference.

BACKGROUND

1. Field

Aspects of embodiments of the present invention relate to an adhesive film for polarizing plates, a polarizing plate including the same, and an optical display apparatus including the same.

2. Description of the Related Art

A liquid crystal display includes a polarizing plate bonded to both sides of a liquid crystal cell via adhesive films. In addition, a touch panel is mounted on a display screen of the liquid crystal display. Among various kinds of touch panels including a capacitive touch panel, a resistive touch panel, an optical touch panel, an ultrasound touch panel, and an electromagnetic touch panel, the capacitive touch panel is generally used in the art. In recent years, a liquid crystal display including a capacitive sensor as a touch sensor unit to provide a touch sensing function is used in the art.

In manufacture of the liquid crystal display, static electricity is generated when a release film is removed from an adhesive film attached to a polarizing plate in order to bond the adhesive film-attached polarizing plate to a liquid crystal cell. In addition, static electricity can be generated upon assembly of the liquid crystal display. The static electricity affects alignment of liquid crystals in the liquid crystal display, thereby causing malfunction of the liquid crystal display. Generation of static electricity can be suppressed by, for example, forming an antistatic layer on an outer surface of the polarizing plate.

On the other hand, a capacitance sensor of a liquid crystal display having a touch sensing function detects a weak capacitance generated by a transparent electrode pattern and a user's finger when the finger approaches a surface of the liquid crystal display. When a conductive layer, such as an antistatic layer, is interposed between the transparent electrode pattern and the user's finger, an electric field generated between a drive electrode and a sensor electrode is disturbed to destabilize capacity of the sensor electrode, thereby deteriorating touch panel sensitivity and causing malfunction of the liquid crystal display. The liquid crystal display having a touch sensing function is required to suppress generation of static electricity and malfunction of the capacitance sensor. In particular, when the adhesive film is left under high temperature/humidity conditions, it is generally difficult for the adhesive film to exhibit the same surface resistance as at normal temperature. In order to solve this problem, it has been suggested to use a hydrophilic monomer, such as a hydroxyl group-containing monomer, in a (meth)acrylic copolymer in the adhesive film or to increase the content of an antistatic agent. However, it is difficult to ensure surface resistance of the adhesive film under high temperature and high humidity conditions through increase in content of the antistatic agent and introduction of the hydroxyl group-containing monomer.

The background technique of the present invention is disclosed in JP Unexamined Patent Publication No. 2013-072951 and the like.

SUMMARY

According to an aspect of embodiments of the present invention, an adhesive film for polarizing plates that has good reliability of surface resistance under high temperature and high humidity conditions and exhibits good peel strength and substrate adhesion while securing target surface resistance is provided.

According to another aspect of embodiments of the present invention, an adhesive film for polarizing plates that has high peel strength at room temperature and at high temperature and a small difference in peel strength between at room temperature and at high temperature to secure good peel strength reliability is provided.

According to another aspect of embodiments of the present invention, an adhesive film for polarizing plates that can realize a touch sensing function and can suppress display failure and/or malfunction even after being left under high temperature and high humidity conditions for a long period of time is provided.

According to another aspect of embodiments of the present invention, an adhesive film for polarizing plates that can minimize or reduce a time for which a whitening phenomenon of liquid crystals disappears upon electric shock is provided.

According to another aspect of embodiments of the present invention, an adhesive film for polarizing plates that is formed of an adhesive composition capable of shortening an aging period to secure good processability and has high peel strength is provided.

According to another aspect of embodiments of the present invention, an adhesive film for polarizing plates that has good moist-heat resistance and/or thermal resistance durability is provided.

According to another aspect of embodiments of the present invention, an adhesive film for polarizing plates that can be applied to an in-cell type liquid crystal panel is provided.

According to one or more embodiments of the present invention, an adhesive film for polarizing plates is provided.

The adhesive film for polarizing plates is formed of an adhesive composition including a (meth)acrylic copolymer, an isocyanate curing agent, a metal chelate curing agent, and an antistatic agent, and has a surface resistance difference $\Delta SR$ of about 1.0 ($\log(\Omega/\square)$) or less, as calculated by the following Equation 1:

$$\Delta SR = SR2 - SR1 \qquad \text{Equation 1}$$

where SR1 is a log value (unit: $\log(\Omega/\square)$) of initial surface resistance of the adhesive film for polarizing plates, and SR2 is a log value (unit: $\log(\Omega/\square)$) of surface resistance of the adhesive film for polarizing plates as measured after the adhesive film is left at 85° C. and 85% RH for 250 hours, and, in Equation 1, SR1 is about 10 ($\log(\Omega/\square)$) or less.

In accordance with one or more embodiments of the present invention, a polarizing plate is provided including the adhesive film for polarizing plates according to the present invention.

In accordance with one or more embodiments of the present invention, an optical display apparatus is provided including the polarizing plate according to the present invention.

DETAILED DESCRIPTION

Figure 1:
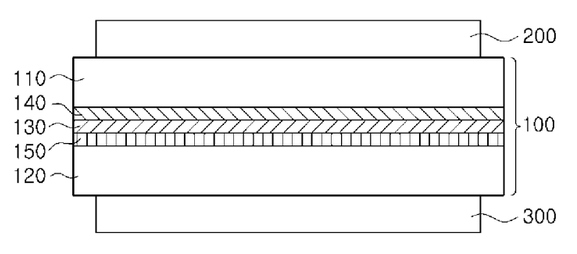
The FIGURE is a cross-sectional view of an optical display apparatus according to an embodiment of the present invention.

Herein, some embodiments of the present invention will be described in further detail with reference to the accompanying drawings. However, it should be understood that the present invention is not limited to the following embodiments and may be embodied in various ways. The following embodiments are described to provide thorough understanding of the invention to those skilled in the art.

Herein, "peel strength" means 180° peel strength between an adhesive film for polarizing plates and a glass plate, as measured at 25° C. or at 85° C. in accordance with ASTM D3330.

Herein, "modulus" refers to storage modulus, as measured on a 0.8 mm thick specimen at 85° C. using an ARES (Advanced Rheometric Expansion System, TA Instruments Inc.) by temperature sweep testing (strain: 5%, normal force: 100 N) at 1 Hz while increasing the temperature from 0° C. to 120° C. at a heating rate of 10° C./min, in which the specimen is prepared by stacking a plurality of adhesive films each having a thickness of 15 µm one above another.

Herein, "initial surface resistance" is measured using a specimen prepared by pressing a release film (PET film) on an upper surface of an adhesive film for polarizing plates in a stack of the release film and the adhesive film using a roller. The prepared specimen is cut into a square shape having a size of 50 mm×50 mm. Then, surface resistance is measured on a surface of the adhesive film exposed by removing the release film (PET film) therefrom using a surface resistance tester (HT-450, Mitsubishi Chemical Co., Ltd.) at 10 V for 10 seconds.

Herein, "surface resistance of the adhesive film for polarizing plates as measured after the adhesive film is left at 85° C. and 85% RH for 250 hours" is measured by the same method as described above after the adhesive film for polarizing plates is exposed by removing the release from the adhesive film and left at 85° C. and 85% RH for 250 hours.

Herein, "(meth)acryl" refers to acryl and/or methacryl.

Herein, "weight average molecular weight" is a value obtained by gel permeation chromatography in accordance with polystyrene standards.

As used herein to represent a specific numerical range, the expression "X to Y" means "greater than or equal to X and less than or equal to Y (X≤ and ≤Y)."

An adhesive film for polarizing plates according to embodiments of the present invention can secure a target surface resistance range at room temperature and reliability of surface resistance under high temperature and high humidity conditions by suppressing variation in surface resistance even with an excess of an antistatic agent and even upon exposure to the high temperature and high humidity conditions for a long period of time, thereby effectively realizing a touch sensing function while suppressing display failure and/or malfunction to minimize or reduce a time for which a whitening phenomenon of liquid crystals disappears upon electric shock. The "whitening phenomenon of liquid crystals disappears upon electric shock" can be determined by an evaluation method using an electrostatic discharge gun described below. In addition, the adhesive film for polarizing plates according to embodiments of the present invention has high peel strength at room temperature, exhibits good peel strength at high temperature even with an excess of an antistatic agent and a reduced difference between peel strength at room temperature and peel strength at high temperature to provide good peel strength reliability and good substrate adhesion, and is formed of an adhesive composition capable of shortening an aging period to secure good processability and good workability and has good moist-heat resistance and/or thermal resistance durability.

Herein, an adhesive film for polarizing plates (herein simply referred to as "adhesive film") according to an embodiment of the invention will be described.

The adhesive film for polarizing plates is formed of an adhesive composition including a (meth)acrylic copolymer, an isocyanate curing agent, a metal chelate curing agent, and an antistatic agent, which will be described in further detail below. Even with an excess of the antistatic agent, the adhesive film for polarizing plates allows the antistatic agent to be slowly eluted from the adhesive film when the adhesive film is left under high temperature and high humidity conditions for a long period of time, thereby securing reliability of surface resistance under high temperature and high humidity conditions, high peel strength at high temperature, and good processability, while minimizing or reducing a time for which the whitening phenomenon of liquid crystals disappears upon electric shock.

The adhesive film has a surface resistance difference $\Delta SR$ of about 1.0 ($\log(\Omega/\square)$) or less, as calculated by the following Equation 1:

$$\Delta SR = SR2 - SR1, \qquad \text{Equation 1}$$

where SR1 is a log value (unit: $\log(\Omega/\square)$) of initial surface resistance of the adhesive film for polarizing plates, and SR2 is a log value (unit: $\log(\Omega/\square)$) of surface resistance of the adhesive film for polarizing plates as measured after the adhesive film is left at 85° C. and 85% RH for 250 hours.

Within this range, the adhesive film has high reliability under high temperature and high humidity conditions to provide no difference, or substantially no difference, in touch sensing performance between before being left under high temperature and high humidity conditions and after being left under high temperature and high humidity conditions.

Here, "initial surface resistance" means surface resistance before the adhesive film is left at 85° C. and 85% RH for 250 hours.

In an embodiment, the adhesive film has a surface resistance difference $\Delta SR$ of about 0 to 1.0 ($\log(\Omega/\square)$), and, in an embodiment, 0.05 ($\log(\Omega/\square)$) to 0.80 ($\log(\Omega/\square)$), and, in an embodiment, 0.10 ($\log(\Omega/\square)$) to 0.60 ($\log(\Omega/\square)$).

In an embodiment, the adhesive film has an initial surface resistance, that is, an initial surface resistance SR1 of Equation 1, of about 10 ($\log(\Omega/\square)$) or less, that is, about $1\times10^{10}\Omega/\square$ or less. Within this range, the adhesive film can effectively realize a touch sensing function while suppressing display failure and/or malfunction to minimize or reduce a time for which a whitening phenomenon of liquid crystals disappears upon electric shock. In an embodiment, SR1 of Equation 1 may be 8 to 10 ($\log(\Omega/\square)$).

In an embodiment, the adhesive film may have a surface resistance of about $1\times10^{8}\Omega/\square$ to about $1\times10^{11}\Omega/\square$ as measured after being left at 85° C. and 85% RH for 250 hours. Within this range, the adhesive film can effectively realize a touch sensing function while suppressing display failure and/or malfunction to minimize or reduce a time for which a whitening phenomenon of liquid crystals disappears upon electric shock.

Despite the presence of an excess of the antistatic agent, the adhesive film may have an initial peel strength of about 1.0 N/25 mm or more at room temperature (25° C.) and a peel strength of about 1.0 N/25 mm or more at high temperature (85° C.). Here, "initial peel strength" means peel strength between the adhesive film and a glass plate, as measured at room temperature (25° C.). In addition, "peel strength at high temperature" means peel strength between the adhesive film and a glass plate, as measured at 85° C. after the adhesive film is left at 85° C. for 5 minutes.

Generally, the aforementioned surface resistance of the adhesive film requires use of an excess of the antistatic agent in the adhesive film, thereby causing deterioration in peel strength due to elution of the antistatic agent to the surface of the adhesive film. Moreover, such deterioration in peel strength of the adhesive film can be further accelerated when the adhesive film is left at high temperature for a long period of time.

However, the adhesive film according to embodiments of the present invention can achieve increase in peel strength through use of the (meth)acrylic copolymer, the isocyanate curing agent, the metal chelate curing agent, and the antistatic agent described in further detail below, and can improve reliability by reducing difference between initial peel strength at room temperature (25° C.) and peel strength at high temperature (85° C.).

In an embodiment, the adhesive film may have a peel strength difference of about 2.0 N/25 mm or less, and, in an embodiment, 0.1 N/25 mm to 1.5 N/25 mm.

In an embodiment, the adhesive film may have an initial peel strength of about 1.5 N/25 mm or more, and, in an embodiment, 1.5 N/25 mm to 5 N/25 mm, and, in an embodiment, 1.5 N/25 mm to 4 N/25 mm.

In an embodiment, the adhesive film may have a peel strength of about 1.0 N/25 mm or more at high temperature (85° C.), and, in an embodiment, 1.0 N/25 mm to 5 N/25 mm, and, in an embodiment, 1.5 N/25 mm to 4 N/25 mm.

In an embodiment, the adhesive film may have a substrate adhesion of about 15 N/25 mm or more, and, in an embodiment, 18 N/25 mm to 25 N/25 mm. Within this range, the adhesive film can have good processability and reliability. The substrate adhesion may be measured by a method described in examples.

In an embodiment, the adhesive film may have a modulus of about 40 kPa or more at 85° C., and, in an embodiment, greater than 40 kPa to 80 kPa, and, in an embodiment, 40 kPa to 60 kPa, and, in an embodiment, 45 kPa to 60 kPa. Within this range, the adhesive film can have good reliability under high temperature and high humidity conditions.

In an embodiment, the adhesive film may have a visible light transmittance of 80% or more, for example, 90% to 100%. Within this range, the adhesive film can be used in an optical display apparatus.

In an embodiment, the adhesive film may have a thickness of about 5 µm to about 50 µm, for example, 5 µm to 20 µm. Within this range, the adhesive film can be used in an optical display apparatus.

Next, the (meth)acrylic copolymer, the isocyanate curing agent, the metal chelate curing agent, and the antistatic agent of the adhesive composition will be described in further detail. The adhesive film may include the (meth)acrylic copolymer, the isocyanate curing agent, the metal chelate curing agent, and the antistatic agent.

(Meth)acrylic Copolymer

The (meth)acrylic copolymer may include a (meth)acrylic copolymer of a monomer mixture including an alkyl group-containing (meth)acrylic monomer, a crosslinking functional group-containing (meth)acrylic monomer, and a (meth)acrylic monomer having a glass transition temperature (Tg) of about 0° C. or more in a homopolymer phase. Herein, "glass transition temperature (Tg) in a homopolymer phase" may be measured using a typical method known in the art.

The alkyl group-containing (meth)acrylic monomer may include a $C_1$ to $C_{20}$ alkyl group-containing (meth)acrylic acid ester. The $C_1$ to $C_{20}$ alkyl group-containing (meth)acrylic acid ester may include at least one selected from among ethyl (meth)acrylate, propyl (meth)acrylate, n-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, without being limited thereto.

In an embodiment, the alkyl group-containing (meth)acrylic monomer may have a glass transition temperature (Tg) of less than about 5° C., for example −80° C., −75° C., −70° C., −65° C., −60° C., −55° C., −50° C., −45° C., −40° C., −35° C., −30° C., −25° C., −20° C., −15° C., −10° C., −5° C., 0° C., or 4° C., and, in an embodiment, −80° C. to 4° C., and, in an embodiment, −80° C. to less than 0° C., in a homopolymer phase. Within this range, the adhesive composition can assist in increasing peel strength of the adhesive film.

The monomer mixture may include at least one type of the alkyl group-containing (meth)acrylic monomer. In an embodiment, in the monomer mixture, the alkyl group-containing (meth)acrylic monomer may be present in an amount of about 40 wt % to about 95 wt %, for example 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %, and, in an embodiment, 45 wt % to 80 wt %. Within this range, the adhesive film can have good reliability.

The crosslinking functional group-containing (meth)acrylic monomer may include at least one selected from among a hydroxyl group-containing (meth)acrylic monomer and an amide group-containing (meth)acrylic monomer. In an embodiment, as the crosslinking functional group-containing (meth)acrylic monomer, the hydroxyl group-containing (meth)acrylic monomer can improve substrate adhesion and peel strength through reaction with the isocyanate curing agent.

The hydroxyl group-containing (meth)acrylic monomer may include at least one selected from among a hydroxyl group-containing $C_1$ to $C_{20}$ alkyl group-containing (meth)acrylic monomer, a hydroxyl group-containing $C_3$ to $C_{20}$ cycloalkyl group-containing (meth)acrylic monomer, and a hydroxyl group-containing $C_6$ to $C_{20}$ aromatic group-containing (meth)acrylic monomer. For example, the hydroxyl group-containing (meth)acrylic monomer may include at least one selected from among 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono (meth)acrylate, 1-chloro-2-hydroxypropyl (meth)acrylate, diethylene glycol mono(meth)acrylate, 2-hydroxy-3-phenyloxypropyl (meth)acrylate, 4-hydroxycyclopentyl (meth) acrylate, and 4-hydroxycyclohexyl (meth)acrylate.

The amide group-containing (meth)acrylic monomer may include (meth)acrylamide, without being limited thereto.

In an embodiment, the crosslinking functional group-containing (meth)acrylic monomer may have a glass transition temperature (Tg) of less than about 5° C., for example, −80° C., −75° C., −70° C., −65° C., −60° C., −55° C., −50° C., −45° C., −40° C., −35° C., −30° C., −25° C., −20° C., −15° C., −10° C., −5° C., 0° C., or 4° C., and, in an embodiment, −80° C. to 4° C., and, in an embodiment, −80° C. to less than 0° C., in a homopolymer phase. Within this range, the adhesive composition can assist in increasing peel strength of the adhesive film.

The monomer mixture may include at least one type of the crosslinking functional group-containing (meth)acrylic monomer. In an embodiment, in the monomer mixture, the crosslinking functional group-containing (meth)acrylic monomer may be present in an amount of about 0.01 wt % to about 20 wt %, for example, 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, 5, 6, 7, 8, 9, 10, 11, 12, 13, 14, 15, 16, 17 18, 19, or 20 wt %, and, in an embodiment, 0.01 wt % to 10 wt %, and, in an embodiment, 0.3 wt % to 4.0 wt %. Within this range, the adhesive film can have good reliability.

The monomer mixture may be free from a carboxylic acid group-containing monomer. With the monomer mixture free from the carboxylic acid group-containing monomer, the adhesive composition can prevent or substantially prevent corrosion of the adhesive film upon attachment of the adhesive film to a metal adherend. As a result, the (meth) acrylic copolymer may have an acid value of about 0.5 mgKOH/g or less, and, in an embodiment, 0 mgKOH/g to 0.5 mgKOH/g, and, in an embodiment, 0 mgKOH/g. Within this range, the adhesive film can suppress corrosion upon contact with a metal-containing optical element. Herein, "acid value" may be measured using a typical method known in the art.

In the (meth)acrylic copolymer, the (meth)acrylic monomer having a glass transition temperature (Tg) of about 0° C. or more in a homopolymer phase can secure reliability of surface resistance and adhesion to an adherend by maintaining both peel strength at high temperature and peel strength at room temperature when used together with the antistatic agent. For example, the (meth)acrylic monomer having a glass transition temperature (Tg) of 0° C. or more in a homopolymer phase may have about 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, or 150° C. as Tg. In an embodiment, the (meth)acrylic monomer has a glass transition temperature (Tg) of 3° C. to 150° C., and, in an embodiment, 5° C. to 130° C., in a homopolymer phase.

In an embodiment, the (meth)acrylic monomer having a glass transition temperature (Tg) of about 0° C. or more in a homopolymer phase may have a higher glass transition temperature in a homopolymer phase than each of the alkyl group-containing (meth)acrylic monomer and the crosslinking functional group-containing (meth)acrylic monomer described above.

The (meth)acrylic monomer having a glass transition temperature (Tg) of about 0° C. or more in a homopolymer phase may include at least one selected from among an alkyl group-containing (meth)acrylic monomer and an alicyclic group-containing (meth)acrylic monomer, which have a glass transition temperature (Tg) of 0° C. or more in a homopolymer phase. For example, the alkyl group-containing (meth)acrylic monomer having a glass transition temperature (Tg) of 0° C. or more in a homopolymer phase may include at least one selected from among methyl acrylate, methyl methacrylate, t-butyl acrylate, t-butyl methacrylate, isobornyl acrylate, isobornyl methacrylate, and acryloyl morpholine.

The monomer mixture may include at least one type of the (meth)acrylic monomer having a glass transition temperature (Tg) of 0° C. or more in a homopolymer phase. In the monomer mixture, the (meth)acrylic monomer having a glass transition temperature (Tg) of 0° C. or more in a homopolymer phase may be present in an amount of about 1 wt % to about 40 wt %, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 wt %, and, in an embodiment, 5 wt % to 35 wt %, and, in an embodiment, 5 wt % to 30 wt %. Within this range, the adhesive film has high peel strength and good reliability.

In an embodiment, the (meth)acrylic copolymer may have a glass transition temperature of about −50° C. or more, for example, −45° C. to −20° C. Within this range, the adhesive film can easily achieve the effects of the present invention.

The (meth)acrylic copolymer may have a weight average molecular weight of greater than about 1,000,000 g/mol, for example, 1,100,000 g/mol or more, and, in an embodiment, 1,500,000 g/mol to 1,800,000 g/mol. Within this range, the adhesive film can easily achieve the effects of the present invention.

The monomer mixture may further include an aromatic group-containing (meth)acrylic monomer.

The aromatic group-containing (meth)acrylic monomer can further improve an effect of suppressing light leakage from the adhesive film. The aromatic group-containing (meth)acrylic monomer is a $C_6$ to $C_{20}$ aromatic group-containing (meth)acrylic acid ester and may include at least one selected from among phenoxy ethyl (meth)acrylate, phenyl (meth)acrylate, and benzyl (meth)acrylate.

In an embodiment, the aromatic group-containing (meth) acrylic monomer may have a glass transition temperature (Tg) of less than about 5° C., for example, −80° C., −75° C., −70° C., −65° C., −60° C., −55° C., −50° C., −45° C., −40° C., −35° C., −30° C., −25° C., −20° C., −15° C., −10° C., −5° C., 0° C., or 4° C., and, in an embodiment, −80° C. to 4° C., and, in an embodiment, −80° C. to less than 0° C., in a homopolymer phase. Within this range, the aromatic group-containing (meth)acrylic monomer can assist in increasing peel strength of the adhesive film.

The monomer mixture may include at least one type of the aromatic group-containing (meth)acrylic monomer. In an embodiment, in the monomer mixture, the aromatic group-containing (meth)acrylic monomer may be present in an amount of about 1 wt % to about 35 wt %, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 wt %, and, in an embodiment, 5 wt % to 25 wt %. Within this range, the adhesive film can suppress light leakage.

The monomer mixture may further include at least one selected from among a $C_3$ to $C_{20}$ alicyclic group-containing (meth)acrylic monomer and a $C_3$ to $C_{20}$ hetero-alicyclic group-containing (meth)acrylic monomer. For each of the $C_3$ to $C_{20}$ alicyclic group-containing (meth)acrylic monomer and the $C_3$ to $C_{20}$ hetero-alicyclic group-containing (meth) acrylic monomer, a typical compound known to those skilled in the art may be used. In an embodiment, at least one of the $C_3$ to $C_{20}$ alicyclic group-containing (meth)acrylic monomer and the $C_3$ to $C_{20}$ hetero-alicyclic group-containing (meth)acrylic monomer may be present in an amount of about 20 wt % or less, for example, 10 wt % or less, in the monomer mixture.

The (meth)acrylic copolymer may be prepared through polymerization of the monomer mixture by a typical polymerization method. The polymerization method may include a typical method known to those skilled in the art. For example, the (meth)acrylic copolymer may be prepared by adding an initiator to the monomer mixture, followed by typical copolymerization, for example, suspension polymerization, emulsion polymerization, solution polymerization, and the like. In an embodiment, polymerization may be performed at a polymerization temperature of 60° C. to 70° C. for 6 hours to 8 hours. The initiator may be selected from a typical initiator including an azo-based polymerization initiator; and/or a peroxide, such as benzoyl peroxide, acetyl peroxide, and the like.

Isocyanate Curing Agent

The isocyanate curing agent can increase substrate adhesion and peel strength by curing the (meth)acrylic copolymer.

The isocyanate curing agent may include a tri- or higher functional isocyanate curing agent. The tri- or higher functional isocyanate curing agent means a curing agent having three or more isocyanate groups. In an embodiment, the isocyanate curing agent may include a tri- to hexa-functional isocyanate curing agent having three to six isocyanate groups.

The tri- or higher functional isocyanate curing agent reacts with the hydroxyl group of the (meth)acrylic copolymer to increase the crosslinking rate and substrate adhesion, thereby increasing the ratio of substrate adhesion of the adhesive film to peel strength thereof while improving reliability of the adhesive film. The tri- or higher functional isocyanate curing agent may include trifunctional isocyanate curing agents including a trifunctional trimethylolpropane-modified toluene diisocyanate adduct, a trifunctional toluene diisocyanate trimer, a trimethylolpropane modified xylene diisocyanate adduct, and the like, and polyfunctional isocyanate curing agents including a hexafunctional trimethylolpropane-modified toluene diisocyanate, a hexafunctional isocyanurate-modified toluene diisocyanate, and the like. In an embodiment, as a trifunctional isocyanate curing agent having an aromatic group and an isocyanurate group, a compound represented by the following Formula 1, and, in an embodiment, toluene diisocyanate trimer, Coronate-2030 (Nippon Polyurethane Co., Ltd.), and the like, may be used.

Formula 1 where $R_1$, $R_2$, and $R_3$ are each independently a substituted or unsubstituted $C_6$ to $C_{10}$ aromatic group.

In Formula 1, "aromatic group" means an arylene group and "substituted" means that at least one hydrogen atom of the aromatic group is substituted with a $C_1$ to $C_5$ alkyl group. In Formula 1, the number of substituents corresponding to "substituted" may be 1 to 4, and, in an embodiment, 1 to 3.

In an embodiment, the isocyanate curing agent may be present in an amount of about 0.01 parts by weight to about 5 parts by weight, for example, 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, or 5 parts by weight, and, in an embodiment, 0.05 parts by weight to 1 part by weight, relative to 100 parts by weight of the (meth)acrylic copolymer, Within this range, the isocyanate curing agent can reduce an aging time of the adhesive film while improving substrate adhesion and durability thereof.

Metal Chelate Curing Agent

The metal chelate curing agent reacts with the (meth) acrylic copolymer to increase the crosslinking rate.

The metal chelate curing agent may be selected from typical curing agents, for example, a curing agent including a metal, such as aluminum, titanium, iron, copper, zinc, tin, titanium, nickel, antimony, magnesium, vanadium, chromium, zirconium, and the like. For example, the metal chelate curing agent may include at least one selected from among aluminum ethyl acetoacetate diisopropylate, aluminum tris(ethyl acetoacetate), alkyl acetoacetate aluminum diisopropylate, aluminum isopropylate, mono-sec-butoxy aluminum diisopropylate, aluminum-sec-butyrate, aluminum ethylate, tetraisopropyl titanate, tetra N-butyl titanate, butyl titanate dimer, titanium acetylacetonate, titanium octylene glycolate, titanium tetra-acetylacetonate, titanium ethyl acetoacetate, titanium polyhydroxy stearate, and aluminum acetylacetonate. In particular, an acetylacetonate group-containing metal chelate curing agent can increase a curing rate of the (meth)acrylic copolymer through volatilization of an acetylacetonate group from the curing agent upon drying an adhesive film prepared by coating and drying the adhesive composition, thereby achieving reduction in process time through reduction in aging time of the adhesive film.

In an embodiment, the metal chelate curing agent may be present in an amount of about 0.01 to about 5 parts by weight, for example, 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 2, 3, 4, or 5 parts by weight, and, in an embodiment, 0.05 parts by weight to 1 part by weight, relative to 100 parts by weight of the (meth)acrylic copolymer. Within this range, the metal chelate curing agent can reduce the aging time of the adhesive film while improving durability thereof.

Antistatic Agent

In an embodiment, the antistatic agent may be present in an amount of about 5 parts by weight to about 30 parts by weight, for example, 5, 6, 7, 8, 9, 10, 11, 12, 13, 14, 15, 16, 17, 18, 19, 20, 21, 22, 23, 24, 25, 26, 27, 28, 29, or 30 parts by weight, and, in an embodiment, 10 parts by weight to 25 parts by weight, and, in an embodiment, 10 parts by weight to 20 parts by weight, relative to 100 parts by weight of the (meth)acrylic copolymer. Within this range of the antistatic agent, the adhesive film can secure reliability and can have $\Delta SR$ of 1.0 ($\log(\Omega/\square)$) or less and SR1 of 10 ($\log(\Omega/\square)$) or less in Equation 1 while minimizing or reducing a time for which the whitening phenomenon of liquid crystals disappears upon electric shock.

The antistatic agent may be selected from any kind of antistatic agent so long as the antistatic agent can impart antistatic properties by providing surface resistance to the adhesive film. The antistatic agent may include a cationic antistatic agent, an anionic antistatic agent, an amphoteric antistatic agent, a non-ionic antistatic agent, or an ion conductive polymer obtained through polymerization or copolymerization of a monomer having an ion conductive group of the cationic antistatic agent, the anionic antistatic agent, or the amphoteric antistatic agent.

The antistatic agent may include a surfactant, an ionic liquid, an alkali metal salt, a metal oxide, fine metal particles, a conductive polymer, carbon, carbon nanotubes, and the like. In an embodiment, the antistatic agent includes a surfactant, an ionic liquid, and an alkali metal salt in terms of transparency or affinity with respect to the (meth)acrylic copolymer.

Examples of the surfactant may include a non-ionic surfactant, a cationic surfactant, an anionic surfactant, and an amphoteric surfactant. Examples of the non-ionic surfactant may include polyoxyethylene alkyl ethers, polyoxyethylene alkyl phenyl ethers, sorbitan esters of fatty acids, sorbitan esters of polyoxyethylene fatty acids, esters of polyoxyethylene fatty acids, esters of glycerin fatty acids, esters of propylene glycol fatty acids, and polyoxyalkylene-modified silicones. Examples of the cationic surfactant may include alkyl trimethyl ammonium salts, dialkyl dimethyl ammonium salts, alkyl benzyl dimethyl ammonium salts, and the like. Examples of the anionic surfactant may include monoalkyl sulfates, alkyl polyoxyethylene sodium sulfates, alkyl benzene sulfonates, monoalkyl phosphates, and the like. Examples of the amphoteric surfactant may include alkyl dimethylamine oxide, alkyl carboxybetaine, and the like.

An ionic compound consists of an anion and a cation, and includes an ionic liquid having a liquid phase at room temperature and an ionic solid having a solid phase at room temperature.

In the ionic compound, a cationic part may include an organic cation or an inorganic cation, for example, cyclic amidine ions, such as imidazolium ions and the like, pyridinium ions, ammonium ions, sulfonium ions, phosphonium ions, organic cations, such as ammonium, pyridinium, imidazolium, phosphonium, and sulfonium, or alkali metal cations. The ammonium may include, for example, a quaternary ammonium salt having four alkyl substituent groups, such as tetra-butyl ammonium; the pyridinium may include, for example, pyridinium obtained through substitution of N of pyridine with an alkyl group, such as 1-ethyl pyridinium, 1-butyl pyridinium, 1-hexyl pyridinium, 1-butyl-3-methyl pyridinium, 1-butyl-4-methyl pyridinium, 1-hexyl-3-methyl pyridinium, 1-butyl-3,4-dimethyl pyridinium, and 1-octyl-4-methyl pyridinium; the imidazolium may include, for example, imidazolium obtained through substitution of the 1,3-position of imidazole with an alkyl group, such as 1-methyl-3-butyl imidazolium and 1-methyl-3-hexyl imidazolium; the phosphonium may include, for example, a quaternary phosphonium salt having four alkyl substituent groups, such as tetrabutyl phosphonium; and the sulfonium may include, for example, a ternary sulfonium salt having three alkyl substituent groups, such as tributyl sulfonium. In addition, the alkali metal cations may include, for example, lithium salt, sodium salt, or potassium salt.

In the ionic compound, an anionic part may include an organic anion or an inorganic anion, for example, $C_nH_{2n+1}COO^-$, $C_nF_{2n+1}COO^-$, $NO_3^-$, $C_nF_{2n+1}SO_3^-$, $(C_nF_{2n+1}SO_2)_2N^-$, $(C_nF_{2n+1}SO_2)_3C^-$, $PO_4^{3-}$, $AlCl_4^-$, $Al_2Cl_7^-$, $ClO_4^-$, $BF_4^-$, $PF_6^-$, $AsF_6^-$, $SbF_6^-$, and the like. In these chemical formulas, n is an integer of 0 or more. In an embodiment, the anion may include OTf (trifluoromethane sulfonate), OTs (toluene-4-sulfonate), Oms (methane sulfonate), $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)n^-$, $(CN)_2N^-$, $C_4F_9SO_3^-$, $(C_2F_5SO_2)_2N^-$, $C_3F_7COO^-$, $(CF_3SO_2)(CF_3CO)N^-$, and the like.

Among these compounds, in an embodiment, a sulfonyl imide compound is used in terms of durability and antistatic properties. By way of example, a compound represented by the following Formula 2 may be used. In an embodiment, in Formula 2, a sulfonyl imide anion is used in that, since fluorine atoms contained in the anion have high electronegativity to provide a large stabilization effect of an anion present in a nitrogen atom, hydrophobicity of the antistatic agent can be improved, thereby securing good compatibility with an acrylic copolymer, no surface migration, durability reliability, and antistatic properties.

$$M^+[(SO_2R)_2N]^-, \qquad \text{Formula 2}$$

where M is an alkali metal, and R is a fluorine atom or a $C_1$ to $C_4$ perfluoro alkyl group.

The alkali metal may be lithium, sodium, potassium, or cesium, and, in an embodiment, lithium, sodium or potassium.

The antistatic compound represented by Formula 2 may include, for example, bis(fluorosulfonyl)imide potassium ($KN(FSO_2)_2$), bis(fluorosulfonyl)imide sodium ($NaN(FSO_2)_2$), bis(fluorosulfonyl)imide lithium ($LiN(FSO_2)_2$), bis(trifluorosulfonyl)imide potassium ($KN(CF_3SO_2)_2$), bis(trifluorosulfonyl)imide sodium ($NaN(CF_3SO_2)_2$), and bis(trifluorosulfonyl)imide lithium ($LiN(CF_3SO_2)_2$), and, in an embodiment, bis(fluorosulfonyl)imide potassium ($KN(FSO_2)_2$), or bis(fluorosulfonyl)imide sodium ($NaN(FSO_2)_2$). These compounds may be used alone as a mixture thereof.

In other embodiments, the antistatic agent may include: amphoteric antistatic agents, such as alkyl betaine and derivatives thereof, imidazoline and derivatives thereof, alanine and derivatives thereof, and the like; non-ionic antistatic agents, such as amino alcohols and derivatives thereof, glycerin and derivatives thereof, polyethylene glycol and derivatives thereof, and the like; an ion conductive polymer obtained through polymerization or copolymerization of a monomer having an ion conductive group (for example, a quaternary ammonium salt group) of the cationic antistatic agent, the anionic antistatic agent, or the amphoteric antistatic agent; a conductive polymer, such as polythiophene, polyaniline, polypyrrole, polyethylenimine, and an allylamine polymer.

In other embodiments, the antistatic agent is an inorganic antistatic agent, such as tin oxide, antimony oxide, indium oxide, cadmium oxide, titanium oxide, zinc oxide, indium, tin, antimony, gold, silver, copper, aluminum, nickel, chromium, titanium, iron, cobalt, copper iodide, indium tin oxide (ITO), antimony tin oxide (ATO), and the like. These inorganic antistatic agents may be used alone or as a mixture thereof.

In an embodiment, the adhesive composition may further include a silane coupling agent.

The silane coupling agent can increase adhesive strength of the adhesive film. The silane coupling agent may include typical silane coupling agents known to those skilled in the art. For example, the silane coupling agent may include epoxy group-containing silane coupling agents, such as glycidoxypropyltrimethoxysilane and glycidoxypropylmethyldimethoxysilane, without being limited thereto.

In an embodiment, the silane coupling agent may be present in an amount of about 0.01 parts by weight to about 5 parts by weight relative to 100 parts by weight of the (meth)acrylic copolymer. Within this range, the adhesive film can have improved adhesive strength.

The adhesive composition may further include a crosslinking catalyst. The crosslinking catalyst can increase the degree of crosslinking of an adhesive layer formed of the adhesive composition. The crosslinking catalyst may include at least one selected from the group of metals and metal-containing compounds. In an embodiment, the crosslinking catalyst may include at least one selected from among a tin-containing compound, a zinc-containing compound, a titanium compound, and a bismuth compound. In an embodiment, the crosslinking catalyst may include at least one selected from the group of dibutyltin dilaurate and dimaleate tin.

In an embodiment, the crosslinking catalyst may be present in an amount of about 0.01 parts by weight to about 1.5 parts by weight relative to 100 parts by weight of the (meth)acrylic copolymer. Within this range, the adhesive composition can have an increased degree of crosslinking and can suppress moisture permeation.

The adhesive film may further include additives. The additives can provide additional functions to the adhesive film. The additives may include at least one selected from among UV absorbents, reaction inhibitors, adhesion improvers, thixotropic agents, conductivity imparting agents, color modifiers, stabilizers, antioxidants, and leveling agents, without being limited thereto.

In an embodiment, the adhesive composition may have a gel fraction difference of about 5% or less, and, in an embodiment, 0% to 5%, between a gel fraction after aging for 4 days and a gel fraction after aging for 7 days, as calculated by the following Equation 2. Within this range, the adhesive composition allows reduction in aging time, thereby securing good processability of the adhesive film.

$$\text{Gel fraction} = (WC - WA)/(WB - WA) \times 100, \quad \text{Equation 2}$$

where WA is the weight of a wire mesh; WB is the total weight of the wire mesh and a specimen wrapped by the wire mesh so as not to leak from the wire mesh, in which the specimen having the adhesive film stacked on a release film is obtained by coating 1.0 g of the adhesive composition to a thickness of 15 μm on the release film, followed by aging the adhesive composition on the release film at 35° C. and 45% RH for 4 days or 7 days; and WC is the total weight of the wire mesh and the adhesive film, in which the adhesive film wrapped by the wire mesh is completely dipped in a sample bottle containing 50 cc ethyl acetate, left for 1 day, and dried at 100° C. for 12 hours.

Here, the gel fraction after aging for 4 days means a gel fraction of the adhesive film subjected to aging for 4 days, and the gel fraction after aging for 7 days means a gel fraction of the adhesive film subjected to aging for 7 days.

Within this range, the adhesive composition can improve productivity of the adhesive film through reduction in aging time. For the adhesive composition, the gel fraction after aging for 4 days is less than the gel fraction after aging for 7 days. In an embodiment, the adhesive composition may have a gel fraction of about 50% to about 90%, and, in an embodiment, 60% to 90%, after aging for 4 days, and a gel fraction of 50% to 99%, and, in an embodiment, 60% to 90%, after aging for 7 days. Within this range of the gel fraction, the adhesive composition can improve productivity of the adhesive film through reduction in aging time.

The adhesive film may be prepared by a typical method using an adhesive composition including the (meth)acrylic copolymer, the isocyanate curing agent, the metal chelate curing agent, and the antistatic agent.

Next, a polarizing plate according to an embodiment will be described.

The polarizing plate may include a polarizer and an adhesive film stacked on a surface of the polarizer, wherein the adhesive film is the adhesive film for polarizing plates according to the present invention. The adhesive film may serve to attach the polarizing plate to an optical element, such as a liquid crystal panel. The polarizing plate may further include a protective layer formed on one or both surfaces of the polarizer.

The polarizer may include a polarizer manufactured using a polyvinyl alcohol resin film. In an embodiment, the polarizer may be a polyvinyl alcohol-based polarizer manufactured by dyeing the polyvinyl alcohol resin film with at least one selected from the group of iodine and a dichroic dye, or may be a polyene-based polarizer manufactured by dehydrating the polyvinyl alcohol resin film.

In an embodiment, the polarizer may have a thickness of 5 μm to 30 μm, and, in an embodiment, 5 μm to 20 μm. Within this range, the polarizer can be used in the polarizing plate and can realize thickness reduction of the polarizing plate.

The protective layer may be formed on one or both surfaces of the polarizer to protect the polarizer. The protective layer may be a protective layer, which is a film type layer, or a protective coating layer, which is a coating layer type layer.

In an embodiment, the protective layer may include a protective film formed of an optically transparent resin. In an embodiment, the resin may include at least one selected from among cyclic polyolefin resins including amorphous cyclic olefin polymer (COP), poly(meth)acrylate resins, polycarbonate resins, polyester resins including polyethylene terephthalate (PET), cellulose ester resins including triacetylcellulose (TAC), polyether sulfone resins, polysulfone resins, polyamide resins, polyimide resins, non-cyclic polyolefin resins, polyarylate resins, polyvinyl alcohol resins, polyvinyl chloride resins, and polyvinylidene resins. In some embodiments, the protective film may be formed of one kind of polyester resin and may be a monolayer film. In an embodiment, the protective film may have a thickness of 5 μm to 200 μm, and, in an embodiment, 10 μm to 150 μm, and, in an embodiment, 20 μm to 100 μm. Within this range, the protective film can be used in the polarizing plate.

In another embodiment, the protective coating layer may be formed of an actinic radiation-curable resin composition including an actinic radiation-curable compound and an initiator. In an embodiment, the protective coating layer may have a thickness of 5 μm to 200 μm, and, in an embodiment, 5 μm to 20 μm, and, in an embodiment, 4 μm to 10 μm. Within this range, the protective coating layer can be used in the polarizing plate. In an embodiment, the protective coating layer may be directly formed on the polarizer. Herein, "directly formed" means that neither an adhesive layer nor a bonding layer is interposed between the polarizer and the protective coating layer.

In an embodiment, the protective layer may be bonded to the polarizer via a bonding agent for polarizing plates. The bonding agent for polarizing plates may be selected from typical bonding agents for polarizing plates known to those skilled in the art. The polarizing plate may further include a functional coating layer on a surface of the protective layer, that is, on a surface of the protective layer opposite to the polarizer. The polarizing plate may further include a release film formed on the other surface of the adhesive film, that is, on a surface of the adhesive film opposite to the polarizer or the protective layer to protect the adhesive film from foreign matter.

Next, an optical display apparatus according to an embodiment will be described.

The optical display apparatus may include the adhesive film for polarizing plates or the polarizing plate according to any of the embodiments. The optical display apparatus may include any of a liquid crystal display, an organic light emitting display, and a flexible organic light emitting display, without being limited thereto. In an embodiment, the optical display apparatus may include a visibility enhancing film including quantum dots to improve color reproducibility and visibility. For example, the optical display apparatus may include a liquid crystal display including in-plane switching (IPS) liquid crystals.

Referring to the FIGURE, in an embodiment, a liquid crystal display includes an in-cell type liquid crystal panel 100, a first polarizing plate 200 disposed on a light exit surface of the in-cell type liquid crystal panel 100, and a second polarizing plate 300 disposed on a light incident surface of the in-cell type liquid crystal panel 100, wherein the first polarizing plate 200 includes the polarizing plate according to an embodiment of the present invention.

In an embodiment, the in-cell type liquid crystal panel 100 includes a first substrate 110, a second substrate 120 disposed to face the first substrate 110, a liquid crystal layer 130 interposed between the first substrate 110 and the second substrate 120, a touch sensor layer 140 interposed between the first substrate 110 and the liquid crystal layer 130, and drive electrodes and a sensor layer 150 interposed between the liquid crystal layer 130 and the second substrate 120.

The second polarizing plate 300 may include a typical polarizing plate well-known to those skilled in the art.

Next, the present invention will be described in more detail with reference to some examples. However, it should be noted that these examples are provided for illustration only and are not to be construed in any way as limiting the present invention.

Preparative Example 1

In a 1 L reactor equipped with a cooler for temperature regulation under a nitrogen atmosphere, a monomer mixture consisting of 69 parts by weight of n-butyl acrylate (BA, Tg in homopolymer phase: −54° C.), 1 part by weight of 4-hydroxybutyl acrylate (4-HBA, Tg in homopolymer phase: −40° C.), 10 parts by weight of methyl acrylate (MA, Tg in homopolymer phase: 10° C.), and 20 parts by weight of phenoxy ethyl acrylate (PEA, Tg in homopolymer phase: −22° C.) was placed, followed by adding 100 parts by weight of ethyl acetate thereto. After removing oxygen from the reactor by purging with nitrogen gas for 1 hour, the reactor was maintained at 62° C. Then, the monomer mixture was uniformly stirred and 0.03 parts by weight of 2,2'-azobisisobutyronitrile (AIBN) was added as a reaction initiator to the reactor, followed by reaction for 8 hours, thereby preparing an acrylic copolymer having a weight average molecular weight of 1,690,000 g/mol.

Preparative Example 2 to Preparative Example 7

Acrylic copolymers were prepared by the same method as in Preparative Example 1 except that the components of the monomer mixture were changed together with the content of AIBN and/or reaction time as listed in Table 1.

Details of components used in preparation of the acrylic copolymers of Preparative Examples 1 to 7 are shown in Table 1.

TABLE 1

|  | BA | MA | t-BA | IBOA | 4-HBA | PEA | Weight average molecular weight |
|---|---|---|---|---|---|---|---|
| Preparative Example 1 | 69 | 10 | 0 | 0 | 1 | 20 | $169 \times 10^4$ |
| Preparative Example 2 | 59 | 20 | 0 | 0 | 1 | 20 | $162 \times 10^4$ |
| Preparative Example 3 | 49 | 30 | 0 | 0 | 1 | 20 | $158 \times 10^4$ |
| Preparative Example 4 | 59 | 0 | 20 | 0 | 1 | 20 | $172 \times 10^4$ |
| Preparative Example 5 | 64 | 0 | 0 | 15 | 1 | 20 | $164 \times 10^4$ |
| Preparative Example 6 | 69 | 30 | 0 | 0 | 1 | 0 | $165 \times 10^4$ |
| Preparative Example 7 | 79 | 0 | 0 | 0 | 1 | 20 | $168 \times 10^4$ |

*In Table 1, t-BA is t-butyl acrylate (Tg in homopolymer phase: 43° C.) and IBOA is isobornyl acrylate (Tg in homopolymer phase: 94° C.).

Details of components used in Examples and Comparative Examples are as follows:

(A) (Meth)acrylic copolymer: (meth)acrylic copolymer in Preparative Examples 1 to 7

(B) Isocyanate curing agent: Coronate-2030S (containing an isocyanurate group and having a methyl group as a substituent group and a phenyl group as an aromatic group in Formula 1, Nippon Polyurethane Co., Ltd.)

(C) Metal chelate curing agent: aluminum acetylacetonate (Sigma Aldrich)

(D) Antistatic agent: FC 4400L (3M)

(E) Silane coupling agent: KBM 403 (3-glycidoxypropyl trimethoxysilane, Shin-Etsu Chemical Co., Ltd.)

Example 1

A composition for adhesive films was prepared by mixing 100 parts by weight of the (meth)acrylic copolymer (A) of Preparative Example 1, 0.5 parts by weight of the isocyanate curing agent (B), 0.1 parts by weight of the metal chelate curing agent (C), 20 parts by weight of the antistatic agent (D), and 0.1 parts by weight of the silane coupling agent (E) in terms of solid content, followed by dilution to a suitable concentration with ethyl acetate.

The prepared composition was coated to a thickness of 15 μm on a PET (polyethylene terephthalate) release film and dried at 110° C. for 4 minutes, thereby preparing a coating for adhesive films.

The coating for adhesive films was attached to one surface of a triacetylcellulose film of a polarizing plate (stack of triacetylcellulose film/polarizer/triacetylcellulose film bonded to each other via a bonding agent and not containing an antistatic agent, thickness: 65 μm), followed by aging at 35° C. and 45% RH for 4 days, thereby preparing a polarizing plate having a 15 μm thick adhesive film for polarizing plates.

Examples 2 to 8

Polarizing plates were manufactured in the same manner as in Example 1 except that the components of the adhesive composition and/or the contents thereof were changed as listed in Table 2 (unit: parts by weight).

Comparative Examples 1 to 5

Polarizing plates were manufactured in the same manner as in Example 1 except that the components of the adhesive composition and/or the contents thereof were changed as listed in Table 2.

Comparative Example 6

Polarizing plates were manufactured in the same manner as in Example 2 except that an epoxy curing agent (YD-128, Kukdo Chemistry Co., Ltd.) was used as the metal chelate curing agent.

TABLE 2

| | (A) | | | | | |
|---|---|---|---|---|---|---|
| | Kind | Content | (B) | (C) | (D) | (E) |
| Example 1 | Preparative Example 1 | 100 | 0.5 | 0.1 | 20 | 0.1 |
| Example 2 | Preparative Example 2 | 100 | 0.5 | 0.1 | 20 | 0.1 |
| Example 3 | Preparative Example 3 | 100 | 0.5 | 0.1 | 20 | 0.1 |
| Example 4 | Preparative Example 4 | 100 | 0.5 | 0.1 | 20 | 0.1 |
| Example 5 | Preparative Example 5 | 100 | 0.5 | 0.1 | 20 | 0.1 |
| Example 6 | Preparative Example 2 | 100 | 0.1 | 0.1 | 20 | 0.1 |
| Example 7 | Preparative Example 2 | 100 | 3.0 | 0.1 | 20 | 0.1 |
| Example 8 | Preparative Example 6 | 100 | 0.5 | 0.1 | 20 | 0.1 |
| Comparative Example 1 | Preparative Example 2 | 100 | 0.5 | — | 20 | 0.1 |
| Comparative Example 2 | Preparative Example 7 | 100 | 0.5 | 0.1 | 20 | 0.1 |
| Comparative Example 3 | Preparative Example 2 | 100 | 0.5 | 0.1 | 0 | 0.1 |
| Comparative Example 4 | Preparative Example 2 | 100 | 0.5 | 0.1 | 2 | 0.1 |
| Comparative Example 5 | Preparative Example 2 | 100 | 0.5 | 0.1 | 40 | 0.1 |
| Comparative Example 6 | Preparative Example 2 | 100 | 0.5 | 0.1* | 20 | 0.1 |

*YD-128: Epoxy curing agent (Kukdo Chemistry Co., Ltd.)

The adhesive compositions, the adhesive films, and the polarizing plates of the Examples and Comparative Examples were evaluated as to properties of Table 3.

(1) Gel fraction and gel fraction difference (unit: %): Gel fractions of the adhesive compositions were measured according to the following Equation 2 and a gel fraction difference was evaluated.

$$\text{Gel fraction} = (WC - WA)/(WB - WA) \times 100, \quad \text{Equation 2}$$

where WA is the weight of a wire mesh, WB is the total weight of the wire mesh and a specimen wrapped by the wire mesh so as not to leak therefrom, in which the specimen having the adhesive film stacked on a release film was obtained by coating 1.0 g of the adhesive composition to a thickness of 10 μm on the release film, followed by aging the adhesive composition on the release film at 35° C. and 45% RH for 4 days or 7 days, and WC is the total weight of the wire mesh and the adhesive film, in which the adhesive film wrapped by the wire mesh was completely dipped in a sample bottle containing 50 mL ethyl acetate, left for 1 day, and dried at 100° C. for 12 hours.

The gel fraction after aging for 4 days means a gel fraction of the adhesive film subjected to aging for 4 days, and the gel fraction after aging for 7 days means a gel fraction of the adhesive film subjected to aging for 7 days.

A gel fraction difference between the gel fraction after aging for 4 days and the gel fraction after aging for 7 days was obtained. A polyethylene terephthalate film (thickness: 38 μm) was used as the release film, a 100-mL wide neck bottle was used as the sample bottle, and a 200 mesh iron net was used as the wire mesh.

(2) Substrate adhesion (N/25 mm): 180° substrate adhesion between an adhesive film and a polarizing plate was measured in accordance with ASTM D3330. Each of the polarizing plates prepared in the Examples and Comparative Examples film was cut into a size of 200 mm×25 mm (length×width). Then, the adhesive film and the polarizing plate of the specimen were coupled to upper and lower jigs of a tensile tester (Texture Analyzer) with a 30 kgf load cell, followed by measuring substrate adhesion upon peeling at 25° C. under conditions of a peeling speed of 300 mm/min and a peeling angle of 180°.

(3) Cut surface: Each of the polarizing plates prepared in the Examples and Comparative Examples film was cut 20 times or more to prepare a specimen having a size of 100 mm×5 mm (length×width). After preparation of the specimen, the cut surface was evaluated by observing the presence or absence of the adhesive film on the cut surface using a microscope. Evaluation criteria were as follows.

○: 18 or more specimens having no problem on cut surfaces thereof

Δ: 11 to 17 specimens having no problem on cut surfaces thereof x: 10 or fewer specimens having no problem on cut surfaces thereof (4) Peel strength (unit: N/25 mm): 180° peel strength of each of the adhesive films of the Examples and Comparative Examples with respect to a glass plate was measured in accordance with ASTM D3330. The adhesive film was cut into a size of 100 mm×25 mm (length×width) and laminated on a glass plate to prepare a specimen. The adhesive film and the glass plate of the specimen were coupled to upper and lower jigs of a tensile tester (Texture Analyzer), followed by measuring peel strength upon peeling at 25° C. under conditions of a peeling speed of 300 mm/min and a peeling angle of 180°.

Another specimen was prepared in the same manner as above. The adhesive film and the glass plate of the other specimen were coupled to upper and lower jigs of a tensile tester (Texture Analyzer). Then, the adhesive film was left under conditions of 85° C. for 5 minutes, followed by measuring peel strength upon peeling at 85° C. under conditions of a peeling speed of 300 mm/min and a peeling angle of 180°.

(5) Reliability of moist-heat resistance and heat resistance: Each of the adhesive films of the Examples and Comparative Examples was attached to a glass plate via an adhesive film under a pressure of 4 to 5 kg/cm² and cut into a specimen having a size of 120 mm×80 mm (length×width).

The specimen was left under conditions of 60° C. and 95% RH for 250 hours or under conditions of 85° C. for 250 hours. Then, the specimen was left at room temperature for 1 hour or more and evaluated with the naked eye or a microscope according to the following criteria. A polarizing plate suffering from no generation of bubbles or cracks was evaluated as "○", a polarizing plate suffering from slight generation of bubbles or cracks was evaluated as "Δ", and a polarizing plate suffering from slight generation of bubbles or cracks was evaluated as "x".

(6) Surface resistance: As prepared in the Examples and Comparative Examples, each of the polarizing plates each having a stack of the PET release film and the adhesive film to 120° C. at a heating rate of 10° C./min, in which the specimen was prepared by stacking a plurality of adhesive films each having a thickness of 15 μm one above another.

TABLE 3

| | Gel fraction | | | Processability | | Peel strength | | | Durability | | | | | | |
|---|---|---|---|---|---|---|---|---|---|---|---|---|---|---|---|
| | Aging for 4 days | Aging for 7 days | Gel fraction difference | substrate adhesion | Cut surface | @25° C. | @85° C. | Peel strength difference | Moist heat resistance | Heat resistance | Surface resistance | | | ESD | Modulus |
| | | | | | | | | | | | SR1 | SR2 | ΔSR | | |
| Example 1 | 76.5 | 78.4 | 1.9 | 18.8 | ○ | 3.1 | 1.7 | 1.4 | ○ | ○ | 9.20 | 9.63 | 0.43 | ⊚ | 52 |
| Example 2 | 75.4 | 77.8 | 2.4 | 19.7 | ○ | 2.7 | 1.2 | 1.5 | ○ | ○ | 9.14 | 9.52 | 0.38 | ⊚ | 54 |
| Example 3 | 74.9 | 77.6 | 2.7 | 18.4 | ○ | 2.5 | 1.4 | 1.1 | ○ | ○ | 9.17 | 9.77 | 0.60 | ⊚ | 58 |
| Example 4 | 72.3 | 76.8 | 4.5 | 18.6 | ○ | 2.8 | 1.6 | 1.2 | ○ | ○ | 9.28 | 9.42 | 0.14 | ⊚ | 60 |
| Example 5 | 71.5 | 74.8 | 3.3 | 18.5 | ○ | 2.3 | 1.5 | 0.8 | ○ | ○ | 9.21 | 9.58 | 0.37 | ⊚ | 59 |
| Example 6 | 63.8 | 64.0 | 0.2 | 19.2 | ○ | 3.8 | 2.8 | 1.0 | ○ | ○ | 9.16 | 9.68 | 0.52 | ⊚ | 51 |
| Example 7 | 84.7 | 89.6 | 4.9 | 20.8 | ○ | 1.5 | 1.1 | 0.4 | ○ | ○ | 9.15 | 9.27 | 0.12 | ⊚ | 59 |
| Example 8 | 75.8 | 77.2 | 1.4 | 20.3 | ○ | 2.2 | 1.1 | 1.1 | ○ | ○ | 9.16 | 9.64 | 0.48 | ⊚ | 51 |
| Comparative Example 1 | 42.8 | 72.8 | 30 | 12.7 | X | 2.3 | 0.8 | 1.5 | Δ | X | 9.16 | 10.25 | 1.09 | ⊚ | 46 |
| Comparative Example 2 | 77.4 | 79.2 | 1.8 | 19.8 | ○ | 4.2 | 0.6 | 3.6 | Δ | X | 9.22 | 10.5 | 1.28 | ⊚ | 48 |
| Comparative Example 3 | 79.4 | 80.2 | 0.8 | 18.1 | ○ | 4.5 | 4.1 | 0.4 | ○ | ○ | 13.21 | 13.50 | 0.29 | X | 59 |
| Comparative Example 4 | 76.4 | 77.5 | 1.1 | 19.5 | ○ | 3.6 | 2.8 | 0.8 | ○ | ○ | 10.56 | 11.23 | 0.67 | Δ | 52 |
| Comparative Example 5 | 59.5 | 70.2 | 10.7 | 16.3 | Δ | 0.8 | 0.4 | 0.4 | Δ | Δ | 7.52 | 8.55 | 1.03 | ⊚ | 42 |
| Comparative Example 6 | 46.3 | 80.6 | 34.3 | 12.8 | X | 2.7 | 1.6 | 1.1 | X | Δ | 9.32 | 10.44 | 1.12 | ⊚ | 42 | for polarizing plates (film thickness: 15 μm) was cut into a square-shaped specimen having a size of 50 mm×50 mm. Surface resistance was measured on a surface of the adhesive film exposed by removing the PET release film therefrom using a surface resistance tester (HT-450, Mitsubishi Chemical Co., Ltd.) at 10 V for 10 seconds, followed by recording a surface resistance value. A log value (unit: $\log(\Omega/\square)$) of the measured surface resistance was defined as SR1.

Another specimen was prepared in the same manner as above. Then, the adhesive film for polarizing plates was exposed by removing the PET release film from the specimen and was left under conditions of 85° C. and 85% RH for 250 hours. A surface resistance value of the adhesive film was recorded by the same method. A log value (unit: $\log(\Omega/\square)$) of the measured surface resistance was defined as SR2. ΔSR was calculated according to Equation 1.

(7) ESD: A polarizing plate was stacked on a liquid crystal panel via an adhesive film for polarizing plates. A voltage of 10 kV was applied to a surface of a triacetylcellulose film using an electrostatic discharge gun to measure a time for which a portion brightened by static electricity was discolored again. The time for which a portion brightened by static electricity was discolored again means a time for which the whitening phenomenon of liquid crystals disappears. A shorter measurement time indicates a better polarizing plate having reliability even upon electric shock.

⊚: 3 seconds or less
○: Longer than 3 seconds to 5 seconds
Δ: Longer than 5 seconds to 20 seconds
X: Longer than 20 seconds (8) Modulus (unit: kPa): Storage modulus was measured on a 0.8 mm thick specimen at 85° C. using an ARES (Advanced Rheometric Expansion System, TA Instruments Inc.) by temperature sweep testing (strain: 5%, normal force: 100 N) at 1 Hz while increasing the temperature from 0° C.

As shown in Table 3, the adhesive films for polarizing plates according to embodiments of the present invention had a low initial surface resistance of 1.0 ($\log(\Omega/\square)$) or less in Equation 1. Accordingly, the adhesive films according to the present invention could realize a touch sensing function even after the adhesive films were left under high temperature and high humidity conditions for a long period of time and could reduce display failure and/or malfunction. Further, the adhesive films according to the present invention could minimize or reduce a time for which the whitening phenomenon of liquid crystals disappears upon electric shock, had high peel strength at room temperature and at high temperature and a small difference therebetween, and exhibited good properties in terms of processability, moist heat durability, and thermal resistance durability. On the contrary, the adhesive films for polarizing plates of Comparative Examples 1 to 6 failed to achieve the effects of the present invention.

Accordingly, embodiments of the present invention provide an adhesive film for polarizing plates that has good reliability of surface resistance and exhibits good peel strength and substrate adhesion while securing target surface resistance under high temperature and high humidity conditions. Embodiments of the present invention provide an adhesive film for polarizing plates that has high peel strength at room temperature and at high temperature and a small difference in peel strength therebetween to secure good peel strength reliability. Embodiments of the present invention provide an adhesive film for polarizing plates that can realize a touch sensing function and can suppress display failure and/or malfunction even after being left under high temperature and high humidity conditions for a long period of time. Embodiments of the present invention provide an adhesive film for polarizing plates that can minimize or reduce a time for which a whitening phenomenon of liquid crystals disappears upon electric shock. Embodiments of the present invention provide an adhesive film for polarizing plates that is formed of an adhesive composition capable of shortening an aging time to secure good processability and high peel strength. Embodiments of the present invention provide an adhesive film for polarizing plates that has good moist-heat resistance and/or thermal resistance durability. Embodiments of the present invention provide an adhesive film for polarizing plates that can be applied to an in-cell type liquid crystal panel.

While some embodiments have been described herein, it should be understood that various modifications, changes, alterations, and equivalent embodiments can be made by those skilled in the art without departing from the spirit and scope of the present invention.

What is claimed is:

1. An adhesive film for polarizing plates formed of an adhesive composition comprising a (meth)acrylic copolymer, an isocyanate curing agent, a metal chelate curing agent, and an antistatic agent,
the adhesive film having a surface resistance difference ΔSR of about 1.0 or less, as calculated by the following Equation 1:

$$\Delta SR = SR2 - SR1,$$

where SR1 is a common logarithm value (unit: log (Ω/□)) of initial surface resistance of the adhesive film, and
SR2 is a common logarithm value (unit: log (Ω/□)) of surface resistance of the adhesive film as measured after the adhesive film is left at 85° C. and 85% RH for 250 hours, and
in Equation 1, SR1 is about 10 (log (Ω/□)) or less,
wherein the (meth)acrylic copolymer comprises a (meth)acrylic copolymer of a monomer mixture comprising a (meth)acrylic monomer having a glass transition temperature (Tg) of about 0° C. or more in a homopolymer phase,
wherein the antistatic agent is present in an amount of about 5 parts by weight to about 30 parts by weight relative to 100 parts by weight of the (meth)acrylic copolymer,
wherein the adhesive film has an initial peel strength of about 1.5 N/25 mm to 5 N/25 mm at 25° C., and a peel strength difference of about 2.0 N/25 mm or less between the initial peel strength at 25° C. and a peel strength at 85° C. after the adhesive film is left at 85° C. for 5 min, and
wherein the peel strength of the adhesive film at 85° C. is at least about 1.0 N/25 mm.

2. The adhesive film for polarizing plates according to claim 1, wherein the adhesive film has a surface resistance of about 1×10⁸Ω/□ to about 1×10¹¹Ω/□, as measured after the adhesive film is left at 85° C. and 85% RH for 250 hours.

3. The adhesive film for polarizing plates according to claim 1, wherein the peel strength difference is about 1.0 N/25 mm or more.

4. The adhesive film for polarizing plates according to claim 1, wherein the adhesive film has a modulus of about 40 kPa or more at 85° C.

5. The adhesive film for polarizing plates according to claim 1, wherein the adhesive composition has a gel fraction difference of about 5% or less between a gel fraction after aging for 4 days and a gel fraction after aging for 7 days, as calculated by the following Equation 2:

$$\text{Gel fraction} = (WC - WA)/(WB - WA) \times 100,$$

where WA is a weight of a wire mesh,
WB is a total weight of the wire mesh and a specimen wrapped by the wire mesh so as not to leak therefrom, in which the specimen having the adhesive film stacked on a release film is obtained by coating 1.0 g of the adhesive composition to a thickness of 15 μm on the release film, followed by aging the adhesive composition on the release film at 35° C. and 45% RH for 4 days or 7 days, and
WC is a total weight of the wire mesh and the adhesive film, in which the adhesive film wrapped by the wire mesh is completely dipped in a sample bottle containing 50 cc ethyl acetate, left for 1 day, and dried at 100° C. for 12 hours.

6. The adhesive film for polarizing plates according to claim 1, wherein the (meth)acrylic copolymer is free from a carboxylic acid group.

7. The adhesive film for polarizing plates according to claim 1, wherein the monomer mixture comprises the (meth)acrylic monomer having the glass transition temperature (Tg) of about 0° C. or more in the homopolymer phase, an alkyl group-containing (meth)acrylic monomer, and a crosslinking functional group-containing (meth)acrylic monomer.

8. The adhesive film for polarizing plates according to claim 7, wherein the (meth)acrylic monomer having the glass transition temperature (Tg) of about 0° C. or more in the homopolymer phase comprises at least one selected from among methyl acrylate, methyl methacrylate, t-butyl acrylate, t-butyl methacrylate, isobornyl acrylate, isobornyl methacrylate, and acryloyl morpholine.

9. The adhesive film for polarizing plates according to claim 7, wherein the monomer mixture comprises about 1 wt % to about 40 wt % of the (meth)acrylic monomer having the glass transition temperature (Tg) of about 0° C. or more in the homopolymer phase, about 40 wt % to about 95 wt % of the alkyl group-containing (meth)acrylic monomer, and about 0.01 wt % to about 20 wt % of the crosslinking functional group-containing (meth)acrylic monomer.

10. The adhesive film for polarizing plates according to claim 7, wherein the monomer mixture comprises an aromatic group-containing (meth)acrylic monomer.

11. The adhesive film for polarizing plates according to claim 10, wherein the aromatic group-containing (meth)acrylic monomer has a glass transition temperature of less than about 5° C. in a homopolymer phase and is present in an amount of about 1 wt % to about 35 wt % in the monomer mixture.

12. The adhesive film for polarizing plates according to claim 1, wherein the isocyanate curing agent has an isocyanurate group.

13. The adhesive film for polarizing plates according to claim 1, wherein the antistatic agent comprises at least one selected from among a surfactant, an ionic liquid, an alkali metal salt, a metal oxide, fine metal particles, a conductive polymer, carbon, and carbon nanotubes.

14. The adhesive film for polarizing plates according to claim 1, wherein the adhesive film comprises about 0.01 parts by weight to about 5 parts by weight of the isocyanate curing agent, and about 0.01 parts by weight to about 5 parts by weight of the metal chelate curing agent.

15. A polarizing plate comprising: a polarizer and the adhesive film for polarizing plates according to claim 1 stacked on a surface of the polarizer.

16. An optical display apparatus comprising the polarizing plate according to claim 15.

* * * * *